US006625356B2

(12) United States Patent
Ticknor et al.

(10) Patent No.: US 6,625,356 B2
(45) Date of Patent: Sep. 23, 2003

(54) MICRO-MECHANICAL WAVEGUIDE OPTICAL DEVICES

(75) Inventors: Anthony J. Ticknor, Cupertino, CA (US); Marc A. Stiller, Boulder Creek, CA (US); John T. Kenney, Palo Alto, CA (US); Ken Purchase, Mountain View, CA (US)

(73) Assignee: Lightwave Microsystems, Corp., San Jose, CA (US)

( * ) Notice: Subject to any disclaimer, the term of this patent is extended or adjusted under 35 U.S.C. 154(b) by 0 days.

(21) Appl. No.: 09/835,260

(22) Filed: Apr. 12, 2001

(65) Prior Publication Data

US 2002/0031305 A1 Mar. 14, 2002

Related U.S. Application Data

(60) Provisional application No. 60/197,102, filed on Apr. 12, 2000.

(51) Int. Cl.[7] .................................................. G02B 6/26
(52) U.S. Cl. .............................. 385/39; 385/9; 385/16; 385/18; 385/30; 385/48; 385/50
(58) Field of Search ................................ 385/25, 9, 48, 385/50, 21, 30, 16, 19, 20, 22, 17, 18, 39; 359/298, 315, 320

(56) References Cited

U.S. PATENT DOCUMENTS

| | | | |
|---|---|---|---|
| 4,938,559 A | | 7/1990 | Bruch et al. |
| 5,024,500 A | * | 6/1991 | Stanley et al. ................. 385/16 |
| 5,078,514 A | | 1/1992 | Valette et al. .................. 385/20 |
| 5,261,015 A | | 11/1993 | Glasheen |
| 5,546,484 A | * | 8/1996 | Fling et al. ..................... 385/16 |
| 5,612,815 A | | 3/1997 | Labeye et al. ................. 359/320 |
| 5,796,886 A | | 8/1998 | Hong et al. .................... 385/21 |
| 5,923,798 A | | 7/1999 | Aksyuk et al. ................. 385/19 |
| 6,022,671 A | | 2/2000 | Binkley et al. ................ 430/321 |

FOREIGN PATENT DOCUMENTS

| | | | |
|---|---|---|---|
| JP | 01292308 A | * 11/1989 | ........... G02B/26/08 |
| JP | 3-203710 | 9/1991 | |
| JP | 5-232350 | 9/1993 | |

OTHER PUBLICATIONS

Ahn, C. H. et al., (1993). "A planar micromachined spiral inductor for integrated magnetic microactuator applications," *Journal of Micromechanical Microengineering*, 3:37–44. (1993).

Petersen, K. E., (1982). "Silicon as a mechanical material," *Proceedings of the IEEE*, 70(5):420–457.

Taylor, W. P. et al., (1998). "Fully integrated magnetically actuated micromachined relays," *Journal of Microelectromechanical Systems*, 7(2):181–191.

Chollet, F. et al., (Jan./Feb. 1999) "Compact Evanescent Optical Switch and Attenuator With Electromechanical Actuation" *IEEE Journal of Selected Topics in Quantum Electronics* 5(1):52–59.

* cited by examiner

*Primary Examiner*—Audrey Chang
*Assistant Examiner*—Denise S. Allen
(74) *Attorney, Agent, or Firm*—Morrison & Foerster LLP

(57) ABSTRACT

Optical devices and methods for attenuating, shuttering, or switching optical signals as found in telecommunications. A platform carrying a portion of a waveguide and residing in a plane of a substrate is tipped, tilted, twisted, or otherwise moved out of the plane of the substrate to divert the path of an optical signal or to change coupling between adjacent waveguides. The platform can be formed by etching a substrate while leaving one or more connection points between the platform and the substrate to hold the platform to the substrate.

46 Claims, 11 Drawing Sheets

MICRO-MECHANICAL WAVEGUIDE OPTICAL DEVICES

This application claims benefit to U.S. Provisional Application No. 60/197,102 filed Apr. 12, 2000.

TECHNICAL FIELD

This invention relates generally to optical devices such as optical switches and dynamically programmable attenuators. In particular, the invention provides implementations for switching optical signals among optical waveguides by means of micro-mechanical displacement of structures. Application of the invention facilitates mechanical optical switches in an integrated photonic circuit. The switches of this invention may be monostable wherein the switch always assumes a specific one of its two valid states when the drive signal is removed, or may be bistable wherein the switch remains in it's most recent valid state when the drive signal is removed. The switches of this invention may also be set within ranges of positions in the region between the valid states to provide continuously-variable optical attenuators in an integrated photonic circuit.

BACKGROUND OF THE INVENTION

Fiber optics communication links are used in numerous applications and in particular are extensively utilized as the primary means of carrying telecommunications and internet traffic between, and increasingly within, concentrations of users. These optical networks and their required management become increasingly sophisticated as their reach and capabilities increases. Of particular importance is a reliable, automatable means for setting and reconfiguring the interconnections of these links at the optical level so the various optical streams may be properly routed. Although it is possible to achieve these functions by converting the optical energy to electrical signals, routing the electrical signals, and converting back to optical, much higher performance can be achieved by directly steering the optical streams. This is referred to as "transparent" switching, since once the setting is configured, the optical signals follow the set routing regardless of the nature of the information they carry. The physical implementation of setting and reconfiguring these transparent interconnections is a primary domain of optical switches.

Current optical switching technology can be divided into two classifications. The first and currently dominant approach is mechanical switching, whereby the physical displacement of at least one element of the optical path within the switch changes the coupling of the optical signals at one input port from one output port to another. Mechanical switches can provide highly efficient switching, with very little of the optical energy getting out of the channel (low insertion loss) and extremely little optical energy leaking into unselected configurations (low crosstalk). Mechanical switches however tend to require rather bulky packaging to help isolate the optical paths from unwanted disturbances, and, being an assembly of mechanical movements and bulk optical devices, are not integrable with the other waveguide devices used in optical network management. Also, being an assembly with moving parts and requiring to maintain tolerances usually below 1 micron, mechanical switches elicit heightened concern for reliability issues. Recently, several approaches have been undertaken to miniaturize mechanical optical switches using the micro-mechanical structures realizable in MEMS technologies. This provides some promise for improvement of the basic mechanical reliability and the potential to place more switch elements in a single package. However, these are still just miniaturized versions of bulk switches and still have significant lengths of optical path outside of waveguides and hence require extra isolation from mechanical disturbances. Furthermore, while these approaches employ processes that can make multiple switches during a single process step, assembly constraints for interfacing fiber to the free-space switch still limit the potential for mass production and there is no accommodation for integration with other waveguide elements.

The other class of optical switches are solid-state whereby the optical paths are wholly within waveguides and the distributions of refractive index are altered by a stimulus, typically a local application of heat or electric field, to route the optical signals along selected branches of the optical path. Such switches are directly integrable with other waveguide devices, and the production methods, including the necessary fiber bonding, are better suited for mass production. Since there is no physical displacement of the alignment for the optical paths, the solid-state switches promise improved reliability over mechanical switches, particularly as evaluated over large populations of switches in real-world deployments. Also, since typical configurations of these types of switches can be continuously tuned from one switch-state to the other, they may also provide the function of a programmable optical attenuator, a function not readily realizable in mechanical switches. These types of switches as standard components represent a less mature technology than standard mechanical switches. In order to optimize the desired sensitivity to the thermal or electric-field stimulus, special materials must be used for the waveguides that invariably do not provide lossless, polarization-insensitive transmission such as is obtained in high-quality silica planar waveguides. The constructed switches may be desirably integrated into complex photonic circuits, but do not typically as yet provide as low insertion loss as mechanical switches and may not be capable of the crosstalk isolation that can be achieved in mechanical switches.

SUMMARY OF THE INVENTION

A hybrid class of optical switches is described whereby mechanical displacements are employed to provide optical switching within standard planar waveguides. The waveguides substantially define the optical paths, while micro-mechanical structures in the substrate effect small displacements of certain waveguide elements with respect to others to conduce switching of the flow of optical signals through the device. The waveguide motions are facilitated by fabricating portions of the waveguide pattern upon micro-machined platforms, including tables, beams, and ribbons, in the silicon substrate.

In one embodiment of the invention, the upper surface of such a platform in the natural or resting state (i.e. the state in which the switch is found when no force is applied to move the platform) is coplanar with the upper surface of the remaining substrate. When properly actuated, such as by electromagnetic or electrostatic fields, the platform rotates out of the plane of the substrate surface or deflects above or below that plane. This can provide several microns change in the separation of waveguide structures near the edge of the platform from waveguide structures on the corresponding edge of the substrate or another platform. There are at least two potential configurations. The first configuration has two coupled waveguides, at least one of which waveguides is movable above or below the plane of the substrate. The waveguide structures are designed such that when the platform and substrate are coplanar, light couples between the waveguide elements on the substrate and those on the platform across the edge of the platform. This coupling may be accomplished by resonant energy transfer between guides running parallel along either side of the platform-substrate separation, or simply by continuation within guides that are axially aligned across an optically small gap between the platform and the substrate. When one (or both) of the waveguides is moved vertically above or below the plane of the substrate, the waveguides no longer couple.

A second optical device utilizes a waveguide that has a cut through it, so that the waveguide runs along or parallel to the surface of the substrate and onto and off of the platform. This device can also be configured in at least two ways. In one configuration using axially-continued coupling, the waveguides are not materially continuous across the edge of the platform, and independent displacement of the waveguide on the platform can be realized with respect to the waveguide on the substrate when the platform is deflected. Any resulting gap can be kept small with respect to the wavelength of the optical signal to minimize unwanted transitional losses.

In other described configurations, no waveguide discontinuities are necessary. The platform on which a portion of the waveguide is positioned is movable so that the discontinuity between the portions of the waveguide can be closed by moving the platform. The motions required to close the axial gap may be as small as a few microns and can be actuated by external forces such as can be generated by electric and/or magnetic forces. The motions may include a small in-plane component to control the size of the physical gap at the platform edge, but the primary switching motion is the out-of-plane component.

The natural position of the moveable elements when no external force is applied is coplanar with the substrate. The optical switch or attenuator would typically be designed to be at a well-defined state for this condition and hence provide stable operation in the absence of any applied external force. Hence one may define the "normal" state as being the condition where the platform surface is coplanar with the substrate. Likewise, the "switched" state may be defined to be the condition where the platform is suitably rotated or deflected out of the plane of the substrate. It is additionally possible to make the switch bistable, for instance by placing a ferromagnetic element on the bottom of the platform and a permanent magnet near the position the ferromagnetic element achieves in the switched position. In this way, when the switch deflects to the switched position, the magnet can hold the switch in that position, and the driving force may be relaxed or removed. When the switch needs to return to its normal state, an opposing impulse may be applied to push it away from the magnet and back towards the normal state. This bistable behavior is typically not available in non-mechanical types of waveguide switches.

In certain embodiments of this invention, the switching from one state to the other occurs continuously within the range of movement rather than abruptly within the displacement. For instance, in the design depicted in [0016], movements of the platform much less than the small movement required for switching will cause a continuous decrease in the portion of the optical signal in the cross state and a complementary continuous increase in the portion of the optical signal in the bar state. As such, by inducing movements within the continuum between the switched conditions it is possible to make a device that functions as a programmable optical attenuator. Since the torsion bar suspending the platform behaves as a spring, there is a monotonic increase in the driving force required for increasing angles of deflection. This permits variable attenuation to be achieved by applying a continuously-variable drive voltage to the switch actuators. In typical configurations, there may not be a linear correspondence of drive voltage to attenuation. Hence, achieving a specific level of attenuation requires a mathematical translation of drive voltage such as with an appropriate non-linear amplifier, or preferably a digital lookup table. Alternatively, a feedback circuit from an output sensor to the drive signal may be used to stabilize the attenuator to a desired level in the optical-output power. The required motions are enabled by simple fabrication of small beam-suspended platforms in the underlying substrate of the planar lightwave circuit (PLC). Such platforms would typically fall into one of three categories: tilt platforms; cantilevered beams; or suspended ribbons. In tilt-platforms, a waveguide at the edge of the platform can be moved relative to a waveguide on the corresponding edge of the substrate by simple rotation of the platform. Likewise for a cantilevered beam, flexing the beam produces the same type of motion for the waveguide elements. Suspended ribbons can be elastically flexed and waveguides upon these beams can be moved correspondingly. Each of these categories will be discussed more fully below. A significant property of all these structures is that the amount of the local displacement on the platform surface gradually vanishes toward the attachment points that suspend the platform from the substrate. This allows the waveguides to be routed between the substrate and the platform crossing these attachment points with no material gap in the waveguide. When the beam is flexed, or platform rotated, the waveguide crossing the moveable part merely twists a bit.

Among other factors, this invention is based upon the technical findings that planar waveguide structures can be realized with substrates that are machined to provide platforms that can be deflected out of the plane of the substrate, and furthermore waveguide films can be patterned such that waveguides can be routed without separation between these platforms and the main body of the substrate by passing along the attachment features. Deflection of the platform can then induce relative displacements of waveguide elements routed to or along the edge of the platform with respect to other waveguide elements routed nearby to the corresponding edge of the main body of the substrate. This can be used to either suppress coupling between waveguides displaced along the boundary of a platform, or to open a discontinuity and induce reflections of optical signals in waveguides displaced across such a boundary. A properly designed deflection of the moveable structure can alternatively be used to direct a waveguide on the moveable structure to change alignment from one waveguide on the substrate to another in a different waveguide plane layered above or below the primary waveguide plane.

BRIEF DESCRIPTION OF THE DRAWINGS

Key relationships of this invention to the field and several representative embodiments thereof will be readily understood by the subsequent detailed description including references to the accompanying drawings, wherein like reference tags refer to equivalent structural members. Within the accompanying drawings.

DETAILED DESCRIPTION OF THE INVENTION

Several embodiments are discussed below and with reference to the attached drawings. These descriptions and drawings are for explanatory purposes and do not exhaustively represent all combinations of waveguide configurations and mechanical assemblies provided by this invention. Those of ordinary skill in the art will readily appreciate that many other variations could be derived originating from these descriptions and cited technical findings without further invention.

There are two primary components to this invention: Structures on the substrate that can be elastically deflected out of the plane of the substrate; and waveguides that can be routed next to and onto these structures. The moveable structures will be referred to generically as platforms and are meant to include tilt platforms, cantilevered beams, and suspended ribbons. There are many ways to produce these platforms. The basic approaches are well described in *Silicon as a Mechanical Material* (Petersen, 1982).

Figure 1:
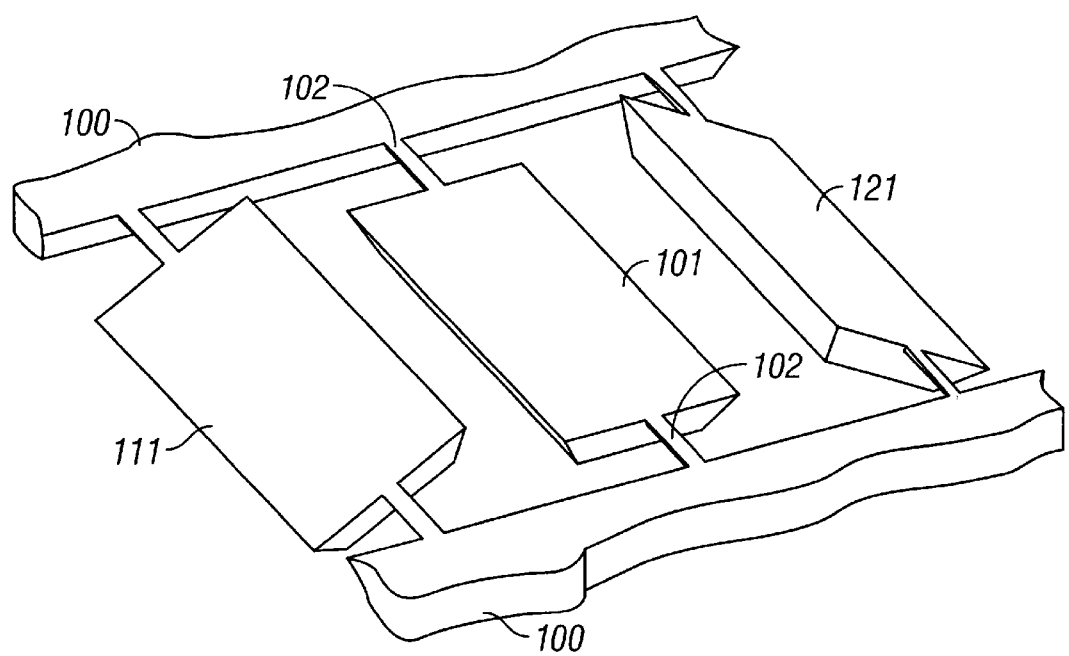
FIG. 1 shows the deflections of a generic tilt platform. The center platform is shown with no net torque applied by the actuators and is hence coplanar with the original substrate. The tables on either side are deflected to rotate out of the plane of the substrate as would occur when electrostatic or electromagnetic torque is applied to the table structure.

Tilt platforms are generically configured as depicted in FIG. 1. For the purposes of this figure, more of the substrate has been removed than would be typical to provide for better visibility. In the application of this invention, the platform would typically be a few hundreds of microns wide and long enough to provide the necessary interaction length for the optical device. A torsion beam at both ends along the longitudinal centerline suspends the platform. The platform is rigid enough that when it is rotated, all the deformation occurs in the torsion beams and the platform remains planar. The platform can be basically formed for instance by anisotropic wet etch from the back of the silicon substrate to form the body of the platform 101 attached only to the substrate 100 along a thin ridge at either end of the platform. A second wet-etch step can be used to further thin the supporting ridges to a specific thickness, typically a few tens to a few hundreds of microns, to form the torsion beams 102. Electrodes can be formed on the underside of the platform by metalizing and etching a pattern to provide one half of an electrostatic or electromagnetic actuator. The corresponding half of the actuator can be formed on a baseplate 609 (as illustrated in FIG. 7A that can then be attached to the bottom of the device (feature 600 in FIG. 6). The baseplate could be for instance another silicon wafer on which metal has been deposited and etched to form the actuator half then adhesively bonded to the primary substrate. The actuators are configured such that when energized, the attractive or repulsive force between them creates an off-centered force between the platform and the substrate which is attached to the baseplate holding the bottom actuator. Since the primary compliance available to the structure is twisting of the torsion beam, the platform responds primarily to the torque component of the actuator force and the platform rotates out of the plane of the substrate as in 111 and 121.

Figure 2:
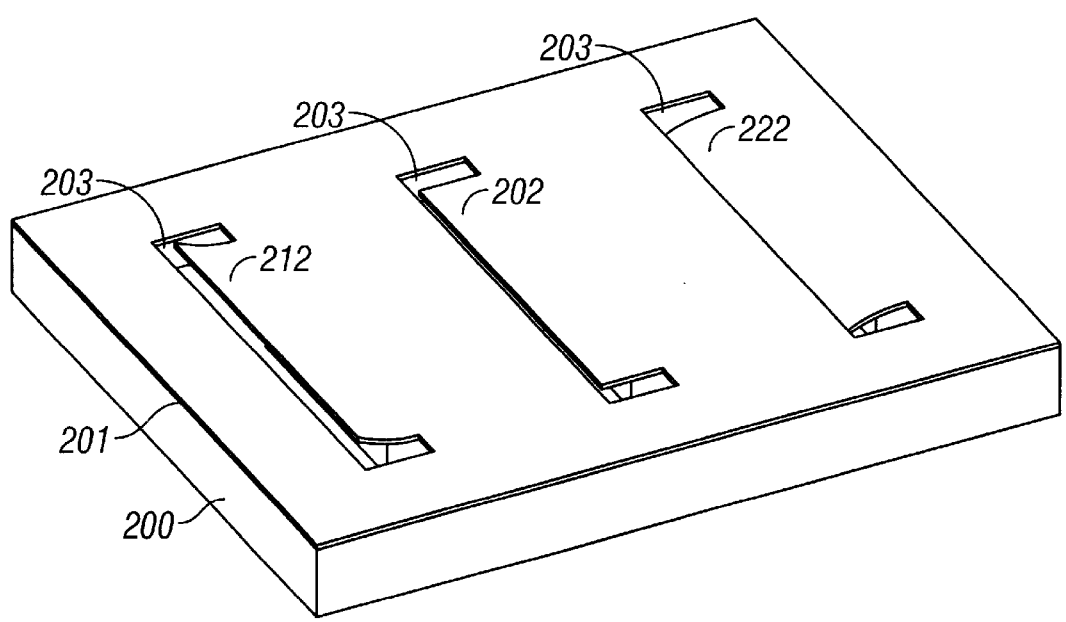
FIG. 2 is a sketch of generic cantilevered beams with no deflection (center) and deflected up (left) and down (right).

In certain embodiments of this invention, a cantilevered beam can provide essentially the same function as a tilt platform. Cantilevered beams are typically processed from the top rather than the back of the substrate and hence require more processing detail. The platform itself may be a layer on the surface of the silicon formed for instance by doping the substrate surface with Boron so that the doped region is not attacked by the etchant used to remove the bulk silicon and free the platform from the substrate. The platform may also be one or more of various materials that can be applied as films on top of the substrate, such as silicon nitride or silica, and may even be the films in which the waveguides themselves are formed. Generic cantilevered-beam platforms without the waveguides thereon are depicted in FIG. 2. For clarity more of the surrounding material is shown removed than would likely be removed in an actual application. For application of this invention, the platform would typically be a few tens of microns wide and long enough to provide a sufficient coupling or interaction area for the desired waveguide device. The platform layer or layers 201 are formed on the substrate 200 and the edges of what is to become the platform are etched open, such as by reactive-ion etching (RIE), to form holes 203. A deep, high-aspect-ratio etch of the waveguide films should be used to minimize the gap between the platform and the substrate films so the trench is no more than a couple of microns wide at the waveguide layer. An isotropic wet-etch is preferably used to etch away silicon from under the platform through the RIE-formed holes. The platform is released from the underlying substrate by this isotropic etch and enough space is opened underneath to allow the desired deflections. The isotropic etch also removes silicon under the surface of the substrate for a width approximately equal to the width of the platform, but since this overhang is supported on three sides, it remains rigid. This forms the basic cantilevered platform 202. A layer of metal can be patterned on the platform to provide a means for creating electrostatic or electromagnetic actuating forces between the metal and substrate or a baseplate. The platform may then be repelled and deflected upwards 212, or it may be attracted and deflected downwards 222. The cantilevered beam is much thinner than the typical tilt platform and the beam may flex in response to a deflecting force. As such the beam itself may deform in response to the actuator force. The attachment line joining the freestanding platform to the anchored region of the film may be thinned or segmented by removing much of the substrate and layers along the line at which the beam joins the remainder of the substrate as depicted in feature 506 of FIG. 5 to focus more of the deformation there, but the platform will still bow when deflected. This makes this configuration better suited for embodiments that don't require a particular alignment in the deflected state, such as will be described later in relation to FIG. 5.

Figure 3:
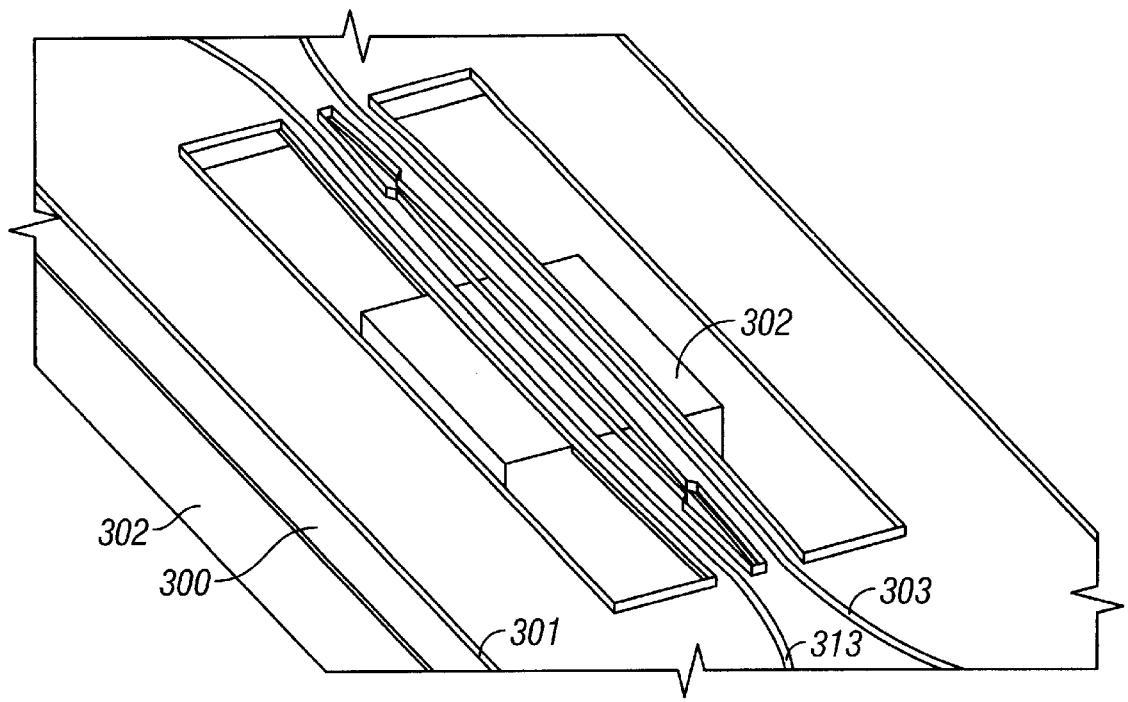
FIG. 3 shows a pair of adjacent suspended ribbons with the left one deflected down and the right one deflected up.

Suspended ribbons can be fabricated in much the same way as cantilevered beams, but each platform is a long, thin beam suspended at each end, rather than being supported along a single edge as for a cantilevered beam. A ribbon is typically at least several millimeters long and no more than a few tens of microns wide. A structure comprising a pair of ribbons is depicted in FIG. 3. A ribbon film 301 such as silicon-nitride is formed on the substrate 300 for instance by chemical-vapor deposition (CVD). A pattern defining the ribbons is etched through the films, typically by RIE, exposing the silicon substrate. The silicon is then isotropically wet etched through the openings in the patterns and undercuts the film to release the beams 303, 313. A co-aligned opening may then be etched from the back, either by dry etching or by wet etch of the back surface only, to provide access to the underside of the ribbons for bulk actuators. Another wafer 302 with integral electrodes placed so as to extend into the hole to within a few tens of microns of the bottom of the ribbons is then permanently bonded to the bottom of the device wafer, for instance with thermal-setting epoxy. The ribbons are sufficiently long to respond to electrostatically-generated forces between the ribbons and the lower electrode by elastically sagging up or down, with the middle sections dropping or raising by up to several microns.

The other primary component of this invention is the waveguide structure. Most any technology for planar-lightwave circuits could be employed, including silica, polymer, silica/polymer hybrid, or even silicon ribs. Silica would typically be preferred for its low loss and high stability, and the silica processing complements the micro-machining. If very large deflections are desired, the added flexibility of polymer or hybrid waveguides might be preferred, but silica can be remarkably flexible in the films being considered, which only have a total thickness of a few tens of microns. Silica films may be applied before or after the micro-machining by any standard glass-deposition means, such as CVD. Polymer films would typically be applied only afterwards by any suitable method such as spin, dip, or melt coating. To provide a continuous surface if post-etch coating is required, the etched features can be back-filled with a sacrificial filler and planarized. Then, after the post-etch films are produced, the sacrificial filler can be exposed and removed. This method is described in Binkley et al. U.S. Pat. No. 6,022,671: Method of making optical interconnects with hybrid construction, which is incorporated by reference in its entirety as if fully put forth herein.

In the figures referenced by the following descriptions, the details of the waveguide and cladding films are not fully illustrated to further aid in clarity. Only key edges of these films are depicted. It is to be understood that where a waveguide channel is drawn, it is intended to represent the waveguide channel embedded in its cladding. Although not typically desired, this is meant to include also configurations using only air as upper and possibly lateral cladding.

Figure 4A:
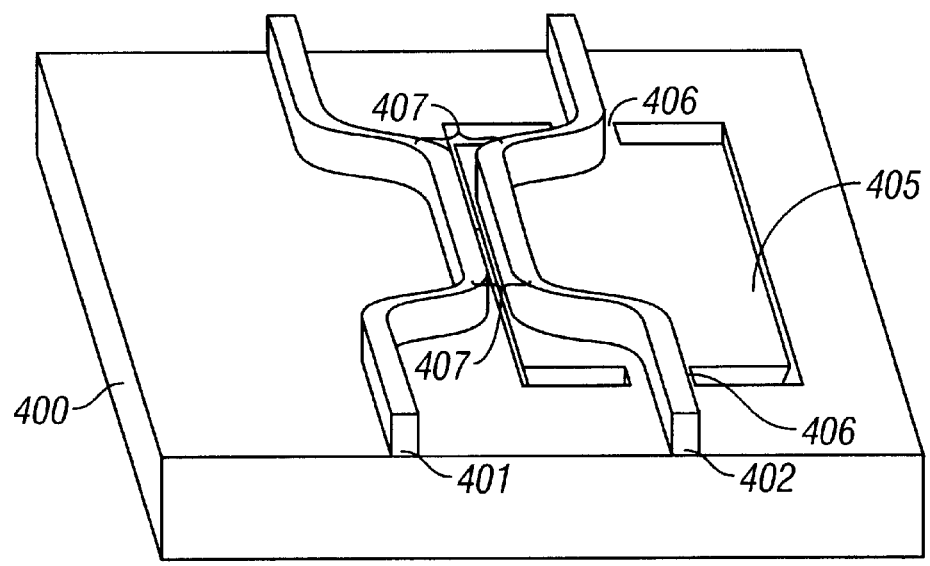
FIG. 4 schematically depicts a 2×2 optical switch or programmable attenuator of the present invention formed by creating a waveguide directional coupler disposed along the edge of a tilt platform wherein a rotation of the platform displaces one arm of the coupler away from the other to decrease or eliminate the coupling of optical signals between the arms.
Figure 4B:
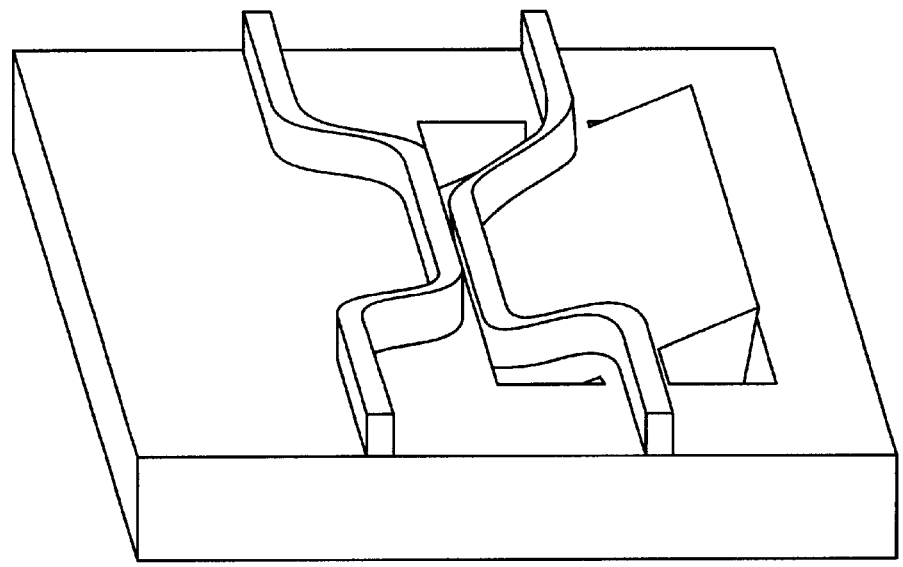

An exemplary embodiment of this invention is represented in FIG. 4. This configuration features fully continuous waveguides and a basic tilt-platform. A thin-film waveguide assembly 401, 402 including a directional coupler is fabricated on a silicon wafer 400 with one arm of the coupler routed on the substrate closely aligned to the location of the edge of the tilt platform, and the other arm of the coupler routed along the same edge of the platform. Most standard waveguide materials are suitable candidates, as long as the resulting film assembly is flexible enough to resiliently accommodate the intended mechanical motions. Typical waveguide systems would be deposited silica or spin-on optical polymers. After the waveguide structures are manufactured, the platform 405 is formed in the substrate as described previously. Separation of the platform is completed by etching grooves through the waveguide films along the edges of the platform, but not over the torsion beams 406. This etching could be done for example by RIE. The gap 407 in the waveguide films along the edge of the platform coincident with the coupler will typically need to be around 1 micron or less if the gap is to be run dry (i.e., an air gap). That gap may be up to several microns wide where it is continuously wetted with a fluid having an index of refraction approximating that of the optical cladding material. Only a few degrees of rotation will be required to operate the device, and the precise value of rotation angle is not critical. The fluid should have a surface tension suitably similar to that of the waveguide film to maintain wetting contact to the film edges along the length of the gap. There are several commercially available index-matching oils and gels that would make suitable candidates, depending on exact film composition. For instance, Gelest, Inc. has several lines of silicone fluids, in particular the "thermal silicone fluids" and "hydrophilic and polar silicone fluids" that provide suitable ranges of viscosity and index-of-refraction for matching the properties needed to wet the gap for silica waveguide films.

Waveguide 402 is configured such that it is routed between the substrate and the platform along the torsion beams suspending the platform. Because the torsion beam defines the rotation center for the platform, because the waveguide film is only several microns on top of the beam, and because only a few degrees of rotation are required to effect switching, A waveguide on top of the beam will experience very little distortion when the platform is deflected. The waveguide can therefore be continuous between the substrate and the platform. Any distortion of the waveguide induced by the small twist of the torsion beam should be well within its elastic limits. As long as the waveguide is not highly birefringent to begin with, there should be no significant impact on the waveguides capability to transmit the optical signal without additional attenuation, modulation, or polarization-dependent loss (PDL) when part of the waveguide is twisted or turned. When the platform is level with the substrate as in (a), optical signals couple from one waveguide to the other and the switch is in the 'cross' state. When the platform is rotated a few degrees as in (b), the gap between the waveguides increases significantly, isolating the waveguides from each other and setting the switch into the 'bar' state. This configuration provides a unique set of properties combining the high-isolation switching of mechanical switches with the integrally aligned optical path and integration capacity of waveguide switches. The same device can also be made using a cantilevered beam as the platform in place of the torsion-beam supported platform.

Figure 5A:
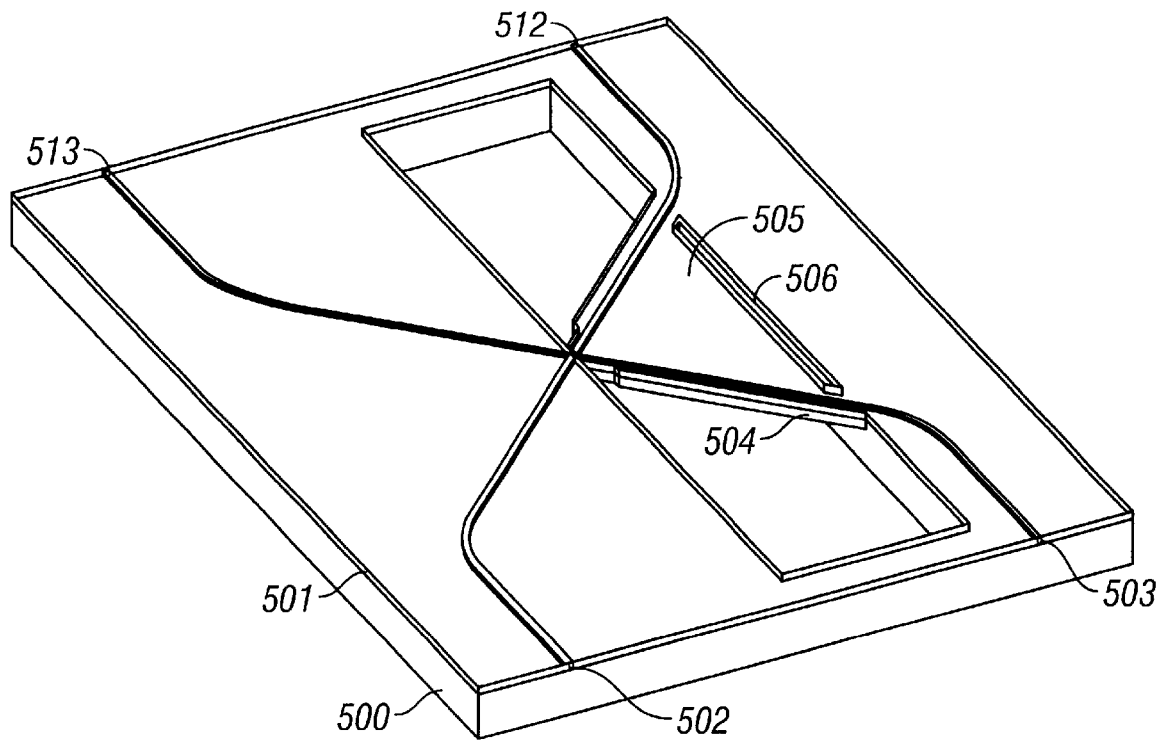
FIG. 5 schematically depicts a 2×2 switch formed by a waveguide crossing bisected by the edge of a cantilevered beam wherein, when the beam is in the undeflected position, optical signals cross the interface uninterrupted and continue on in their respective collinear waveguides. When the beam is deflected, a waveguide-to-air interface is opened and optical signals will undergo total-internal reflection at each interface, switching the optical signals to the complementary state.
Figure 5B:
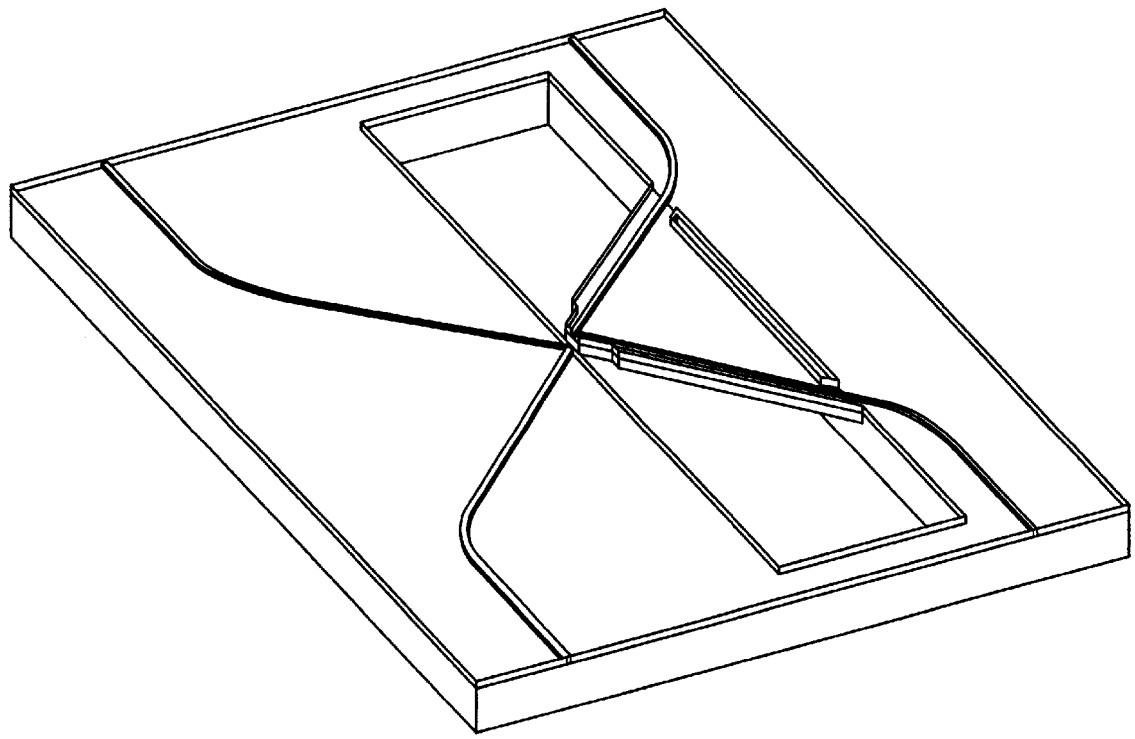

Another embodiment according to the present invention is depicted in FIG. 5. Here crossing waveguides 502/512 and 503/513 intersect at a position on the boundary between the main body of the substrate 500 and the platform 505. The platform in this illustration is a cantilevered beam and is formed by the waveguide films 502 and a thin layer of silicon 501 that was doped to resist etching. An extra gap 506 is depicted etched along the attachment line of the platform to decrease the force needed to flex the beam. The platform 504 is cut at an angle matching the waveguides and tapered even nearer the waveguides near the edge in order to minimize the contact line between the platform and substrate to just the point required for the optical function. This easily decreases the susceptibility to processing defects adversely affecting the operation of the device. When the platform is undeflected as in (a), the gap in the waveguide film between the platform and the body of the substrate is not large compared to wavelength of the light in the waveguides (e.g. three microns or less for a light wavelength of 1.55 micron). In this case, optical signals in the waveguides cross the gap, connecting 502 with 512 and 503 with 513 and defining the 'cross' state. When the beam is deflected slightly, as in (b), the waveguides intersecting the gap are exposed only to air and optical signals in the waveguides experience total-internal reflection (TIR), connecting 502 with 513 and 503 with 512 and defining the 'bar' state. A properly configured ME procedure can etch the waveguide film with a suitably small gap and adequate sidewall verticality, but it typically requires significant process development to match the tool and material system well enough to achieve this. Furthermore, a thin film of glass may be redeposited on the sides of the etched trench, for instance by CVD, to reduce the air gap even further. Alternatively, the critical sections of the gap may be etched with a focussed-ion beam (FIB) to get narrower, more vertical trenches. The FIB method would typically have reduced throughput as compared to RIE only.

Figure 6:
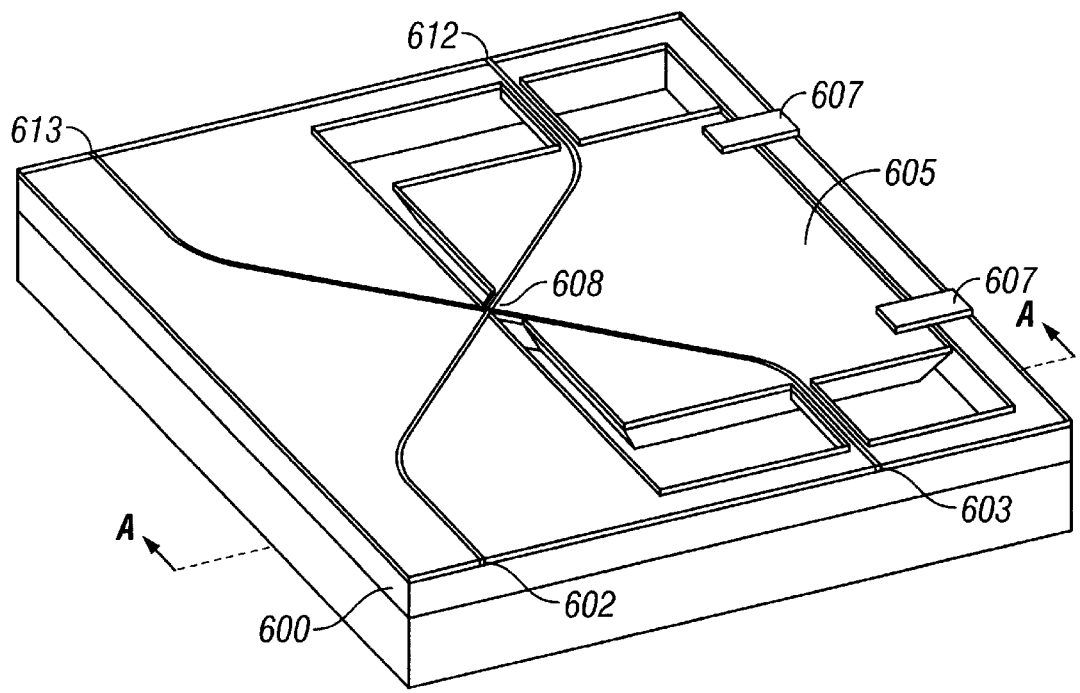
FIG. 6 provides the same behavior as the device of FIG. 5 but on a tilt platform. Enhanced performance may be achieved for the undeflected state by providing a lateral flexing of the beam platform to eliminate the residual gap in the waveguides at the platform edge, as will be detailed more fully below.
Figure 7A:
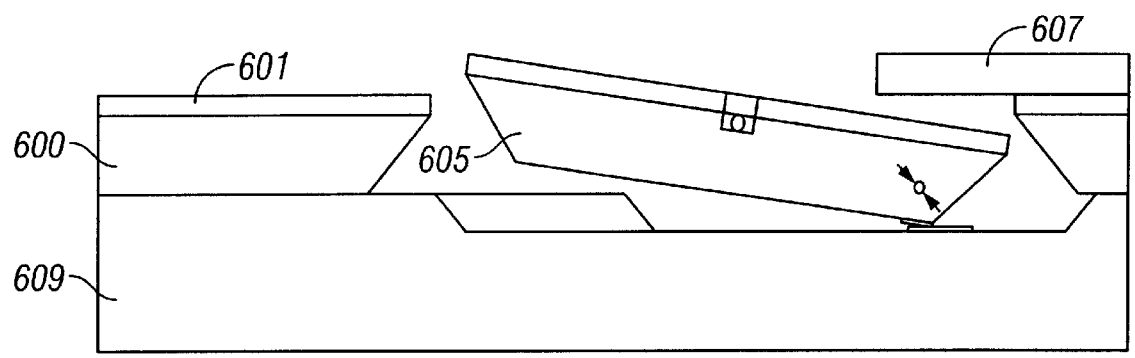
FIG. 7 shows the device of FIG. 6 along the central cross-section whereby in progression the configuration is shown with the actuator in an attractive condition (upper), a neutral condition (center) and finally a repulsive condition to close the residual gap (lower).

The device depicted in FIG. 6 is the same device as FIG. 5 using a tilt platform instead of the cantilevered beam. Here, a nib 608 is formed in the waveguide film along the active gap to again minimize the line of close contact to the length necessary for the optical function. As before, in the undeflected state, waveguides 602 and 612 are connected as are waveguides 603 and 613 forming the 'cross' state. When platform 605 is rotated, waveguides 602 and 613 are connected through TIR, as are waveguides 603 and 612, forming the 'bar' state. As with the other structures, many of the standard types of actuators commonly used in MEMS devices can suitably be used to effect the switching movements. Electrostatic actuators such as are described in *Petersen* are typically the easiest to realize. Integrated electromagnetic actuators such as are described in *Ahn and Allen* and in *Taylor et al.* are also possible and typically provide greater forces in switching applications. Selection of the preferred method entails consideration of several operational characteristics such as actual geometry and dimensions, need for a repulsive force, allowable power dissipation, available voltage and power, and potential electromagnetic interferences. The addition of stops 607 are also shown to further stabilize the 'cross' state, taking advantage of the fact that the film on the platform and on the main body of the substrate arise from a common initial film and hence their upper surfaces are coplanar. The stops can be simple chips of polished silicon clamped and bonded along their edges to eliminate the bond-line gap that would arise by bonding along the surfaces, thereby physically stopping the rotation of the platform where the platform is aligned with the substrate.

Figure 7B:
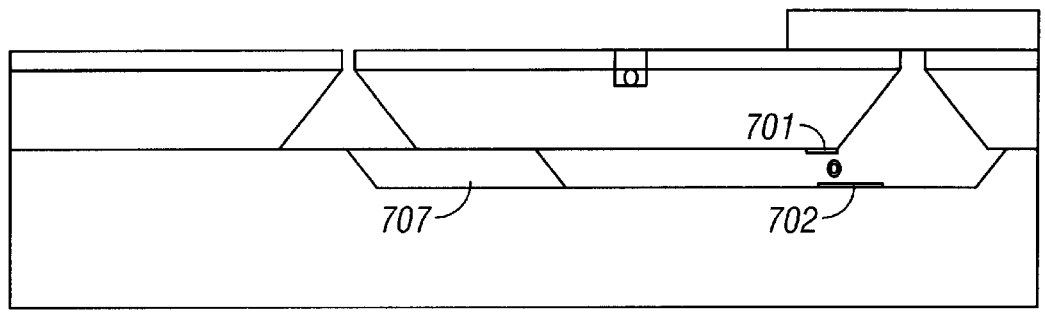
Figure 7C:
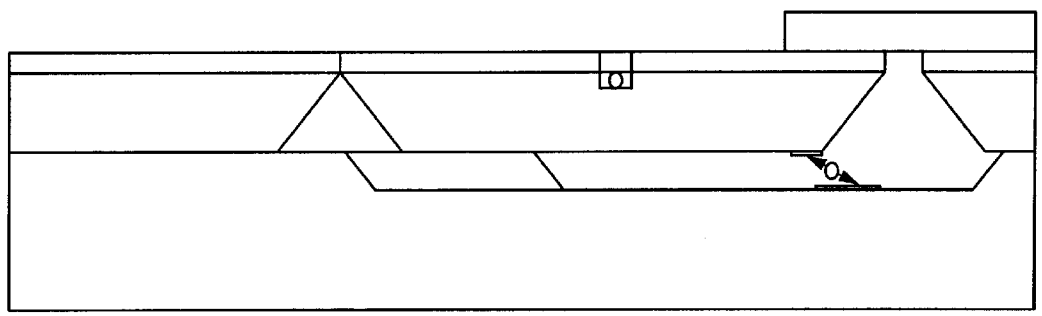

FIG. 7 is a detail cross-section of FIG. 6 along the section line AA. Pictured additionally is a bottom stop/rail 707 that is an extension of the original surface of the baseplate into the baseplate recess, and the electromagnetic actuator pair 701 and 702. When the actuators are energized for attraction, the platform rotates as in (a) and the switch is configured to the 'bar' state. When the actuators are not energized, the platform returns to the horizontal position as in (b) and the switch is configured to the 'cross' state. Due to practical limitations of etching the waveguide films to separate the platform, the residual gap is on the order of 1-micron and the performance of the 'cross' state is not optimum. If the actuators are energized to produce a repelling force, the stops 607 and 707 prevent any rotation of the platform. However, the horizontal component of the repelling force can cause the platform to slide along the stops enough to close-up the residual gap as illustrated in FIG. 7(c), improving the channel isolation of the device for the 'cross' state. The gap need not be passively wetted in the devices illustrated in FIG. 5–FIG. 7 since a clean waveguide-air interface is required to achieve the total-internal-reflection needed for the 'bar' state.

Figure 8A:
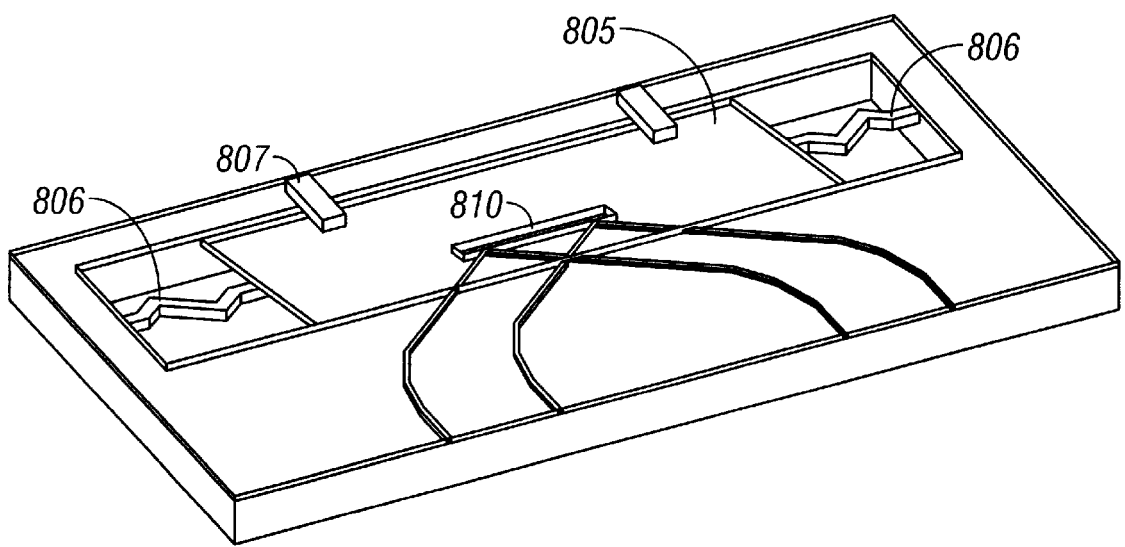
FIG. 8 is an embodiment of the type shown in FIG. 6 for an 'add-drop' 2×2 switch. In this configuration, there are no optical signals in any waveguide on the platform when it is in the deflected position. There is no static connection between the waveguides on the platform and the waveguides on the substrate, hence no waveguides need be routed over the support beam. This allows a more sophisticated beam structure to further accommodate the lateral motion for closing the residual gap, a more detailed example being described below.
Figure 8B:
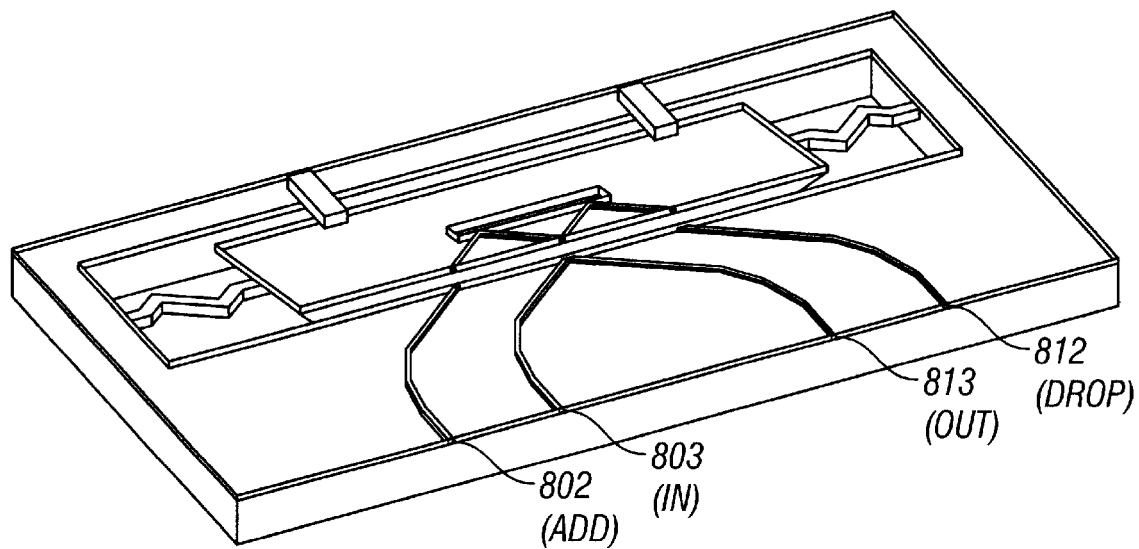

An add/drop switch utilizing the basic platform/substrate structure illustrated in FIG. 6 is depicted in FIG. 8. Herein the portions of waveguides 603 and 612 that were routed along the beam and onto the platform in FIG. 6 have instead been positioned across the edge of the platform. When platform 805 is level with the body of the substrate as in (a), optical signals are connected between waveguides 803 and 812 by reflecting off the wall of trench 810 as well as between 802 and 813 in similar fashion. When the platform is tilted away from stop 807 as in (b), optical signals are coupled between 803 and 813 by reflecting off the edge of the gap, while 802 and 812 are isolated. This add/drop function is slightly more restricted than the 'cross' vs. 'bar' states of the 2×2 switch depicted in [0018]. The optical state for condition (a) is the 'access' state where add port 802 is routed to out port 813 while in port 803 is routed to drop port 812. The optical state for condition (b) is the 'through' state where in port 803 is routed to out port 813 and the add and drop ports 802 and 812 are isolated from the passing optical signals. Since no waveguides are routed onto the platform along the torsion beams 806, these beams may be defined to include segments that are not principally aligned along the straight line between their ends, for instance by using a 'zig-zag' pattern as shown in the figure. This increases the effective length of the beam to be more than the straight-line distance between the ends. Since moving the platform side-to-side slightly increases the distance between the two ends of the beams, laterally shifting the platform to close the residual gap can produce very large strains on the beams and their attachment points when linear beams are used. Employing the longer beams with off-axis sections allows this lateral flex to be made with less stress. These beams may take other shapes besides the zig-zag shape illustrated and may be, for instance, curved paths that approximate a sine wave or cosine wave when viewed from above or some other meandering shape that increases the effective length of the beams.

Figure 9A:
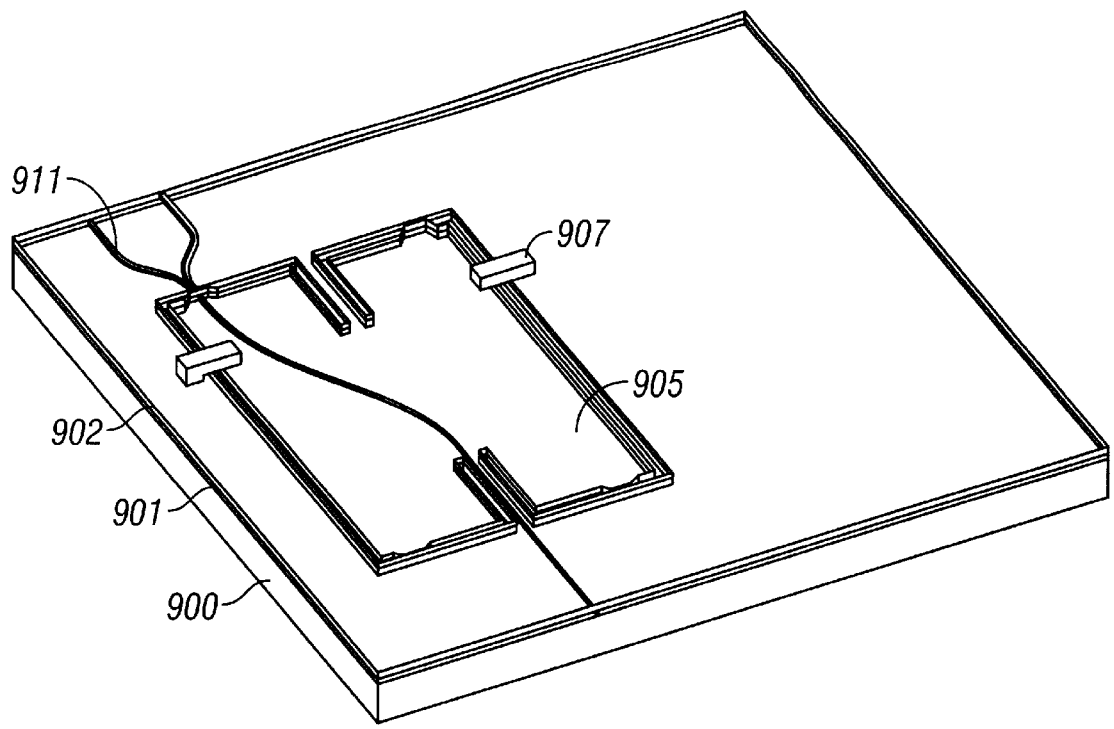
FIG. 9 shows an embodiment for a 1×2 switch wherein the input waveguide is routed onto a tilt platform and then couples into an output waveguide across an interface near an opposing corner of the platform. When the platform is rotated by a specific amount, the waveguide on the platform becomes aligned to another output waveguide within a layer that is at a different level above the substrate than the original output waveguide.
Figure 9B:
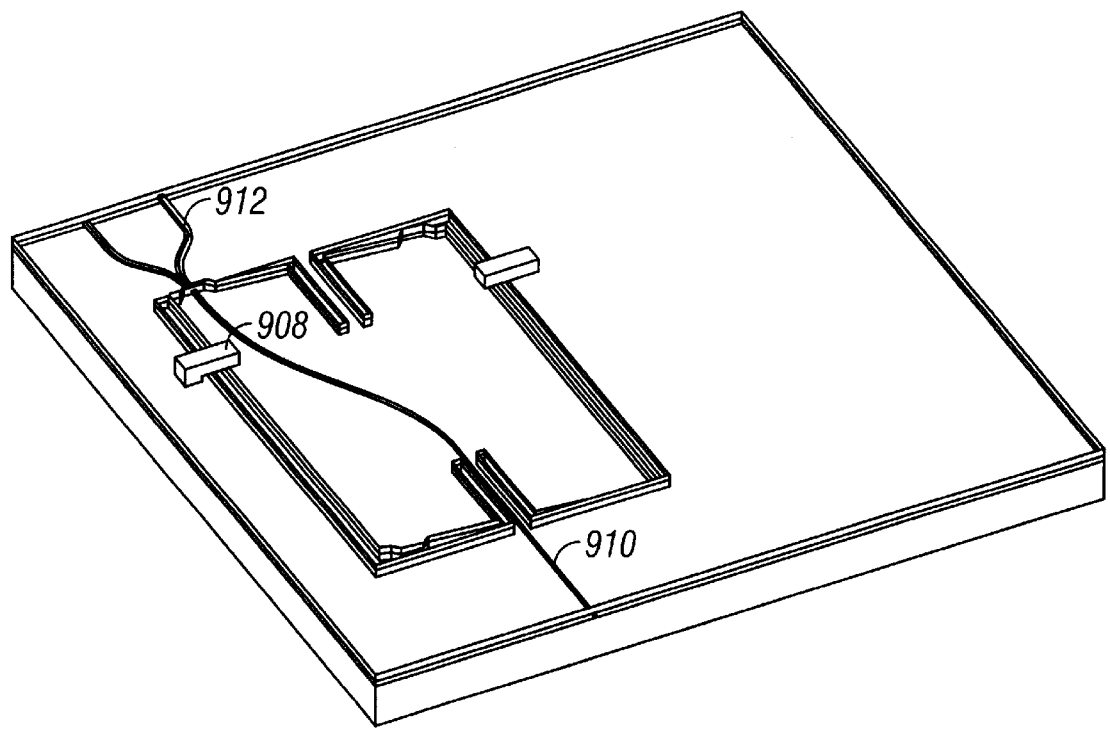

A further embodiment of the present invention is depicted in FIG. 9. The illustrated switch has two distinct layers of waveguides, lower layer 901 is built on the substrate 900 as normal, and upper layer 902 is built on top of the lower one.

Figure 10:
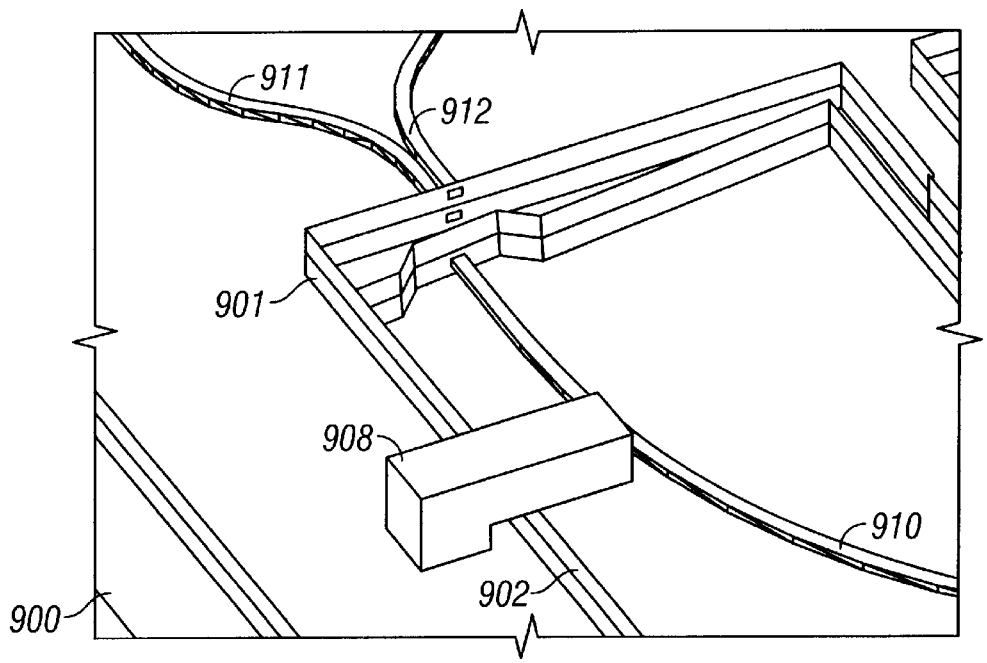
FIG. 10 is a detail view of the coupling area of the device of FIG. 9 with the platform rotated away to expose a view of the output waveguides.

The waveguide films are constructed from the substrate upwards by any of the conventional waveguide formation techniques, such as CVD film deposition and RIE channel definition. Stop 907 helps stabilize platform 905 in the undeflected state, and waveguide 910 aligns with waveguide 911 forming one state of the switch as in (a). Stop 908 contains a recess of just the right dimension, typically in the range of 15–30 microns, such that it limits the rotation of the platform when actuated at a position where waveguide 910 aligns with waveguide 912 forming the other state of the switch, as in (b). Stop 908 may be constructed for instance by precision etching of the necessary step into a silicon wafer which is then diced into many of the small required blocks. These blocks can then be clamped and bonded to the waveguide surface over the substrate. FIG. 10 shows a close-up of the switching interface. Here the table is illustrated as if it were rotated the wrong direction in order to expose the detail. This is not a valid position for the table in this particular switch, it is illustrated in this position to expose detail relationships in the drawing.

Figure 11:
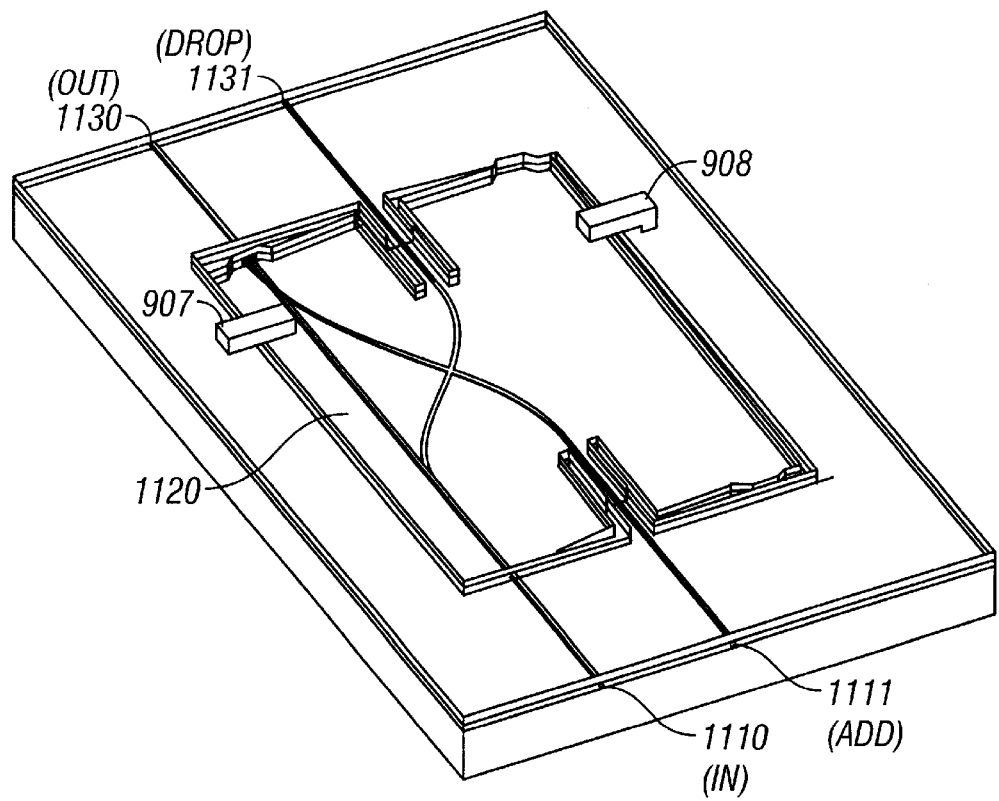
FIG. 11 is a 2×2 'add-drop' optical switch based on the same mechanical configuration as in FIG. 9. When the platform is untilted, the 'add' port couples to the output port while the input port couples to the 'drop' port. When the platform is tilted against the raised stop, the straight waveguide on the platform lowers to form a connection between the input and output ports while the add and drop ports are isolated.

FIG. 11 is a further variation of the embodiment shown in FIG. 9. Here all the waveguides are in the lower layer except one straight section 1120 in the upper layer on the platform. When the platform is level, input guide 1110 is connected to drop-port 1131 while the add port 1111 is connected to the output port 1130. When the platform is rotated to stop 908, waveguide 1120 connects 1110 to 1130 forming the 'through' state while the 'add' and 'drop' ports are isolated. Multiple layers of silica waveguides are made by building upper layers over lower layers in much the same way that the lower layers are built on the basic substrate, preferably including a planarization of the cladding of the lower layer. This planarization might be done for instance by mechanical polishing of the wafer surface after annealing the cladding for the lower layer.

Figure 12:
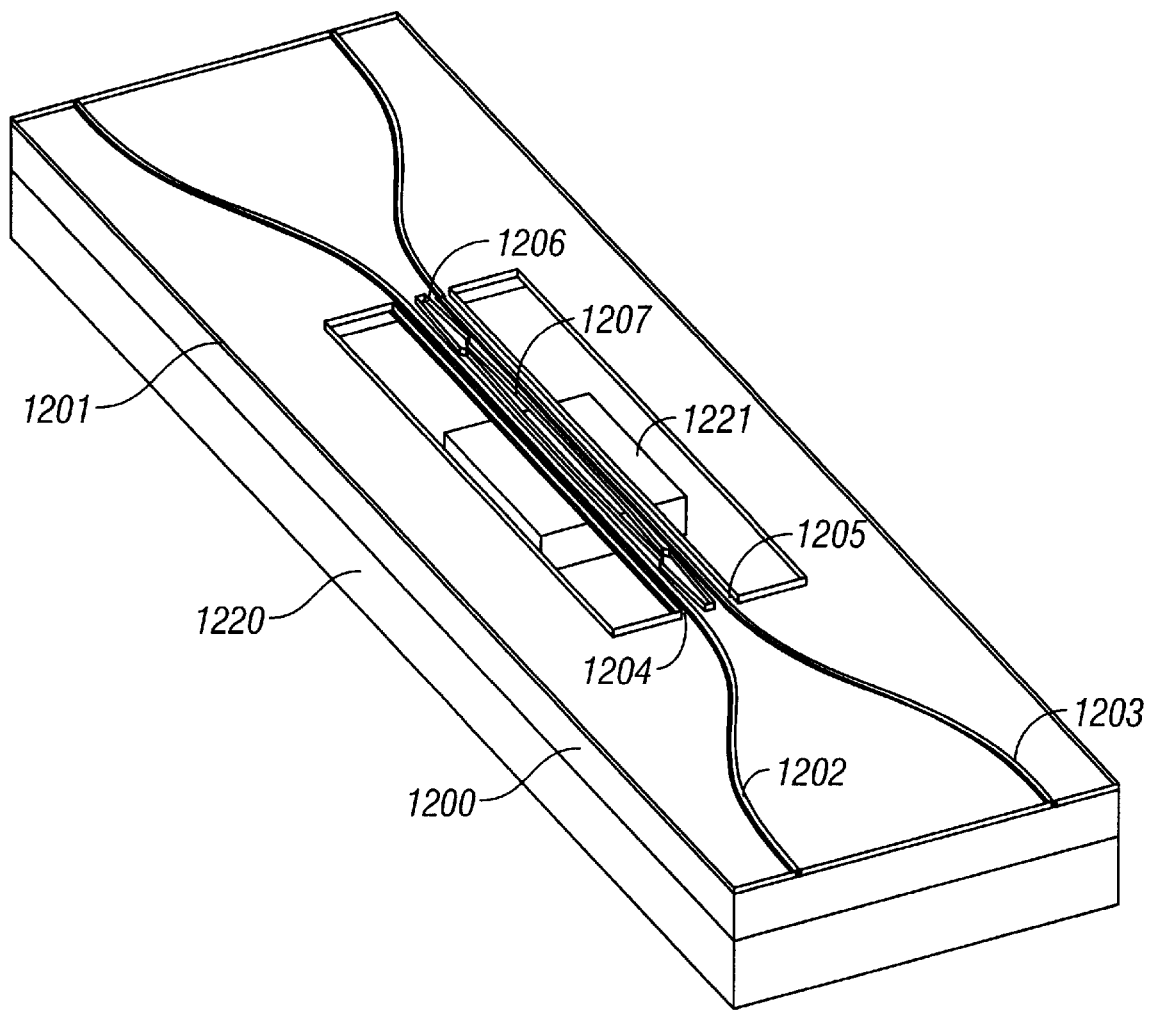
FIG. 12 shows a switch formed by a directional coupler wherein the waveguides in the coupling region are formed upon long elastic beams or ribbons. When a force is applied to the beams, such as might result from the application of an electric or magnetic field, one or both of the beams can be made to sag up or down, opening the gap and isolating the waveguides.
Figure 14A:
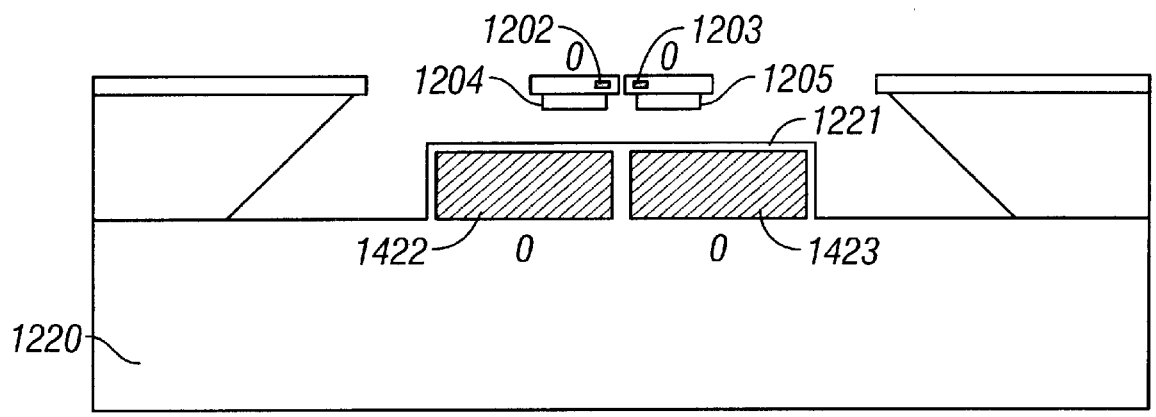
FIG. 14 shows a central cross-section of the device sketched in FIG. 12 with the beams deflected in opposite directions to isolate the waveguides and configure the switch for the 'bar' state.
Figure 14B:
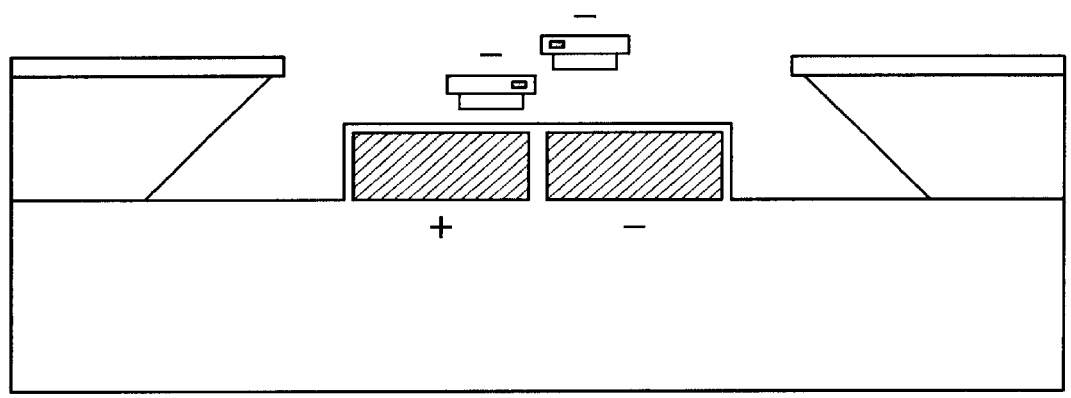

Another embodiment of the current invention is depicted in FIG. 12 utilizing suspended ribbons. The ribbons shown could be constructed for instance by first creating a Boron-doped layer on a silicon wafer by implanting Boron to a level of about $10^{20}$ cm$^{-3}$ to a depth of a few microns. Then standard silica waveguides could be made in layer 1201 for instance by CVD/RIE including CVD-deposited bottom cladding. The opening pattern can then be etched through the silica and doped silicon to expose undoped silicon. The ribbons could then be released by wet etching the underlying silicon to the desired clearance. The back of the ribbons may be made accessible by lapping down the back of the wafer to expose the etched well, or a hole may be wet-etched through from the back with an anisotropic, selective etchant such as aqueous Ethylene diamine Pyrocatechol (EDP) as described in Petersen. The doped silicon resists the etch and remains to form the platform and support the waveguides. The resulting structure is a pair of closely-spaced suspended ribbons 1204 and 1205. Each ribbon supports an arm of a waveguide directional coupler 1202 and 1203. Metal is applied to the underside of the ribbon through the etched-through hole or, if the silicon doping was done in a pattern to electrically isolate each beam, the silicon can be used as the upper half of the electrostatic actuator. Baseplate 1220 is attached to the bottom of substrate body 1200 inserting the lower half 1221 of the actuators closely below the ribbons as illustrated in FIG. 14. The gap 1207 between the ribbons would typically be around 1 micron or less if in air, or up to several microns if a suitable fluid such as an oil having a refractive index about equal to the refractive index of the core fills the gap. The gap between the waveguides is widened at each end by virtue of the etched pattern as shown at 1206 to help suppress coupling near the ends where little motion of the ribbons occurs. When the ribbons are undeflected or equally deflected, the waveguides closely parallel each other along the ribbons and the device functions as a directional coupler, forming the 'cross' state of a 2×2 switch. If one ribbon is deflected and the other is not, or if they are deflected in opposing manner, the waveguides separate and coupling is substantially decreased, allowing the 'bar' state of the 2×2 switch to be formed. As with the device of FIG. 14, deflections smaller than those required to switch the device may also be used to provide a device for continuously-variable attenuation.

Figure 13:
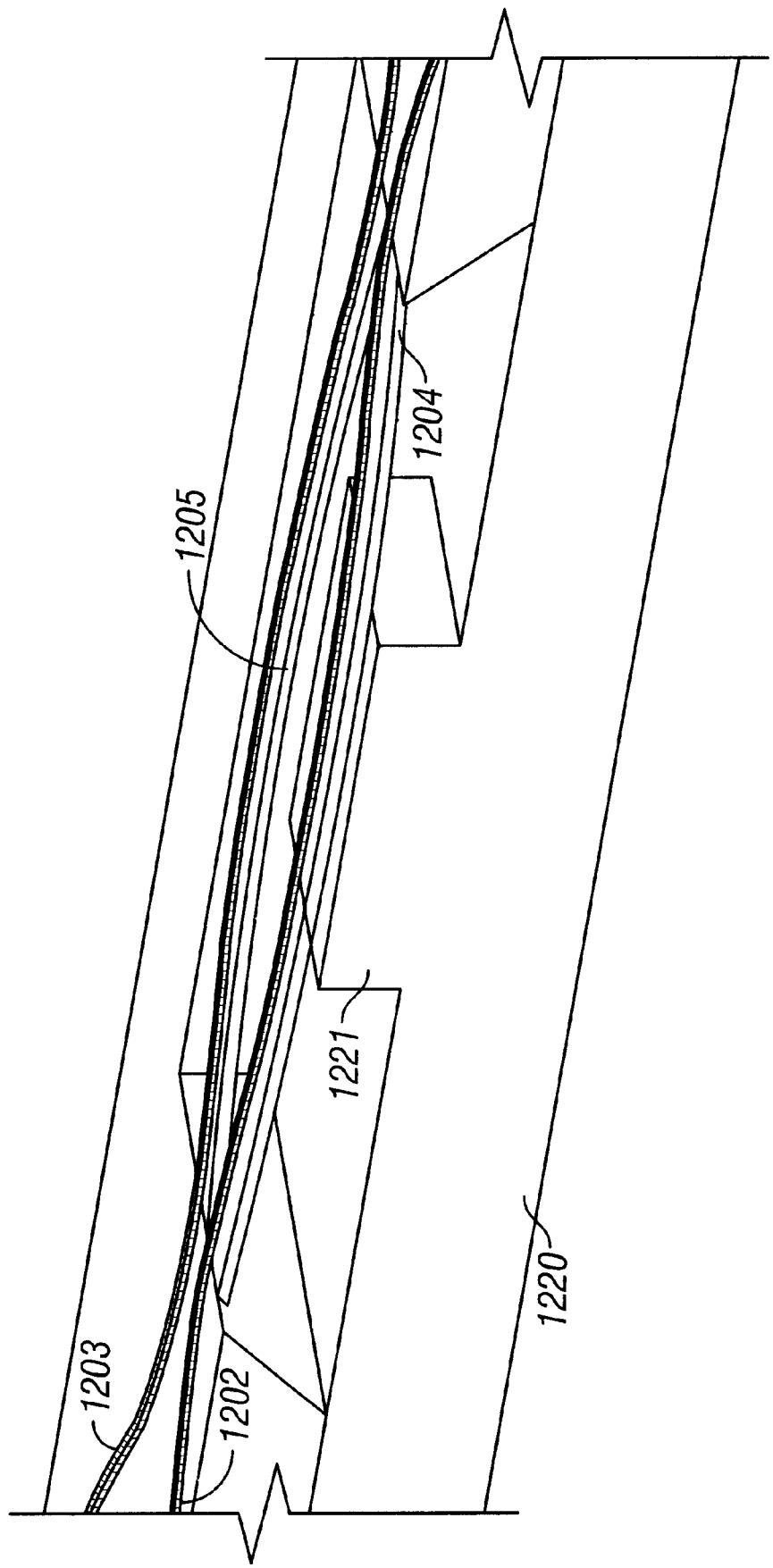
FIG. 13 shows a cut-away view of the beams and waveguides of the device in FIG. 12 when the beams are deflected in opposing directions.

FIG. 13 shows a close-up inspection view of the ribbons with ribbon 1204 pulled down towards the lower actuator 1221 and ribbon 1205 pushed up away from the lower actuator. Similarly FIG. 14 shows a lateral central cross section of the device and further reveals that actuator 1221 contains 2 conductive wires 1422 and 1423. The actuator surface would be on the order of 10 microns below the normal position of the ribbons and each wire would be accurately aligned directly underneath a ribbon. The wires are coated with a thin layer of dielectric such as silica or polymer to prevent direct contact of the ribbons to the wires, which could cause electrical shorting. In (a) no potentials are applied and the ribbons are undeflected. The waveguides 1202 and 1203 couple and the device would be in the cross-state. If the actuator wire 1422 is charged to a finite voltage, for instance +50V and ribbon 1204 is charged to a voltage of the opposite polarity, for instance −50V, electrostatic attraction between the charge on the ribbon and the potential of lower actuator will compel ribbon 1204 to bend down towards the lower actuator. At the same time, applying the same polarity as ribbon 1204 (i.e. −50V) also to ribbon 1205 and wire 1423 will induce a repelling force between ribbon 1205 and both the lower actuator and other ribbon, compelling ribbon 1205 to deflect upwards and both ribbons to flex slightly sideways away from each other. This separation will extinguish the coupling between the waveguides and set the device into the 'bar' state.

What is claimed is:

1. An optical waveguide device comprising (i) a substrate having a platform attached to the substrate at attachment points, which platform is twistable about the attachment points and out of the plane of the substrate, and (ii) a first waveguide, wherein twisting said platform effects a change in power of an optical signal travelling through the first waveguide.

2. An optical waveguide device according to claim 1 wherein the attachment points and the platform are formed from a portion of the substrate.

3. An optical waveguide device according to any of claims 1–2 wherein a portion of the first waveguide resides on the platform.

4. An optical waveguide device according to claim 3 wherein the first waveguide traverses at least one of the attachment points.

5. An optical waveguide device according to claim 3 and further comprising a second waveguide traversing a second deflectable platform, wherein a portion of the first waveguide is separated from a portion of the second waveguide in a coupler region of the device by a first distance when the second deflectable platform and the platform on which the first waveguide resides are deflected and a second distance when the second deflectable platform and the platform on which the first waveguide resides are not deflected, and wherein power of an optical signal traversing the first waveguide couples to the second waveguide at a first separation, which first separation is equal to the first distance or the second distance or is between the first distance and the second distance, and wherein at a second separation not equal to the first separation less of the power of the optical signal traversing the first waveguide couples to the second waveguide.

6. An optical waveguide device according to claim 4 and further comprising a second waveguide traversing a second deflectable platform, wherein a portion of the first waveguide is separated from a portion of the second waveguide in a coupler region of the device by a first distance when the second deflectable platform and the platform on which the first waveguide resides are deflected and a second distance when the second deflectable platform and the platform on which the first waveguide resides are not deflected, and wherein power of an optical signal traversing the first waveguide couples to the second waveguide at a first separation, which first separation is equal to the first distance or the second distance or is between the first distance and the second distance, and wherein at a second separation not equal to the first separation less of the power of the optical signal traversing the first waveguide couples to the second waveguide.

7. An optical waveguide device according to claim 3 and further comprising a second waveguide, wherein a portion of the first waveguide is separated from a portion of the second waveguide in a coupler region of the device by a first distance when the platform is deflected and a second distance when the platform is not deflected, and wherein power of an optical signal traversing the first waveguide couples to the second waveguide at a first separation, which first separation is equal to the first distance or the second distance or is between the first distance and the second distance, and wherein at a second separation not equal to the first separation less of the power of the optical signal traversing the first waveguide couples to the second waveguide.

8. An optical waveguide device according to claim 4 and further comprising a second waveguide, wherein a portion of the first waveguide is separated from a portion of the second waveguide in a coupler region of the device by a first distance when the platform is deflected and a second distance when the platform is not deflected, and wherein power of an optical signal traversing the first waveguide couples to the second waveguide at a first separation, which first separation is equal to the first distance or the second distance or is between the first distance and the second distance, and wherein at a second separation not equal to the first separation less of the power of the optical signal traversing the first waveguide couples to the second waveguide.

9. An optical waveguide device according to claim 7 wherein the portion of the second waveguide in the coupler region is positioned on the substrate.

10. An optical waveguide device according to claim 8 wherein the portion of the second waveguide in the coupler region is positioned on the substrate.

11. An optical waveguide device according to claim 7 wherein the portion of the first waveguide and the portion of the second waveguide in the coupler region remain coupled at the second distance to form an optical attenuator.

12. An optical waveguide device according to claim 8 wherein the portion of the first waveguide and the portion of the second waveguide in the coupler region remain coupled at the second distance to form an optical attenuator.

13. An optical waveguide device according to claim 9 wherein the portion of the first waveguide and the portion of the second waveguide in the coupler region remain coupled at the second distance to form an optical attenuator.

14. An optical waveguide device according to claim 10 wherein the portion of the first waveguide and the portion of the second waveguide in the coupler region remain coupled at the second distance to form an optical attenuator.

15. An optical waveguide device according to claim 7 wherein the portion of the first waveguide and the portion of the second waveguide in the coupler region are not coupled at the second distance.

16. An optical waveguide device according to claim 8 wherein the portion of the first waveguide and the portion of the second waveguide in the coupler region are not coupled at the second distance.

17. An optical waveguide device according to claim 9 wherein the portion of the first waveguide and the portion of the second waveguide in the coupler region are not coupled at the second distance.

18. An optical waveguide device according to claim 10 wherein the portion of the first waveguide and the portion of the second waveguide in the coupler region are not coupled at the second distance.

19. An optical waveguide device according to claim 3 wherein the first waveguide traverses the platform and the first waveguide has a discontinuity at a boundary between the platform and the substrate such that an optical signal travelling through the first waveguide is attenuated or shuttered when the platform is deflected out of the plane of the substrate.

20. An optical waveguide device according to claim 4 wherein the first waveguide traverses the platform and the first waveguide has a discontinuity at a boundary between the platform and the substrate such that an optical signal travelling through the first waveguide is attenuated or shuttered when the platform is deflected out of the plane of the substrate.

21. An optical waveguide device according to claim 19 further comprising a second waveguide positioned to receive the optical signal when the platform is deflected out of the plane of the substrate.

22. An optical waveguide device according to claim 20 further comprising a second waveguide positioned to receive the optical signal when the platform is deflected out of the plane of the substrate.

23. An optical waveguide device according to claim 21 wherein the second waveguide is positioned so that the optical signal transmits across the discontinuity from the first waveguide and into the second waveguide.

24. An optical waveguide device according to claim 22 wherein the second waveguide is positioned so that the optical signal transmits across the discontinuity from the first waveguide and into the second waveguide.

25. An optical waveguide device according to claim 21 wherein the second waveguide is positioned so that the optical signal reflects at the discontinuity from the first waveguide and into the second waveguide.

26. An optical waveguide device according to claim 22 wherein the second waveguide is positioned so that the optical signal reflects at the discontinuity from the first waveguide and into the second waveguide.

27. A method of altering the power of an optical signal traveling through a waveguide to effect attenuation, shuttering, or switching of an optical signal, said method comprising twisting a platform having a first portion of a first waveguide mounted thereon a sufficient amount out of a plane of a substrate to move said portion of the waveguide and induce a change in power of the optical signal travelling through the waveguide.

28. A method according to claim 27 wherein said first portion of said first waveguide is optically aligned with a second portion of said first waveguide when said platform is in the plane of the substrate so that the optical signal traverses the first portion of the first waveguide and the second portion of the first waveguide, and wherein the first portion loses optical alignment with the second portion of the first waveguide as the platform is deflected out of the plane of the substrate.

29. A method according to claim 28 wherein at least a portion of said optical signal transmits from an end of the first portion of the waveguide and is lost.

30. A method according to claim 28 wherein said platform is twisted a sufficient amount that the optical signal reflects from an end of the first portion of the waveguide and to a second waveguide so that the optical signal switches to the second waveguide when the platform is twisted said amount.

31. A method according to claim 28 wherein said platform is twisted a sufficient amount that the optical signal transmits from an end of the first portion of the waveguide and to a second waveguide so that the optical signal switches to the second waveguide when the platform is twisted said amount.

32. A method according to claim 27 wherein said first portion of said first waveguide is sufficiently close to a second waveguide on a portion of the substrate when said platform is in the plane of the substrate that the optical signal evanescently couples in the first portion of the first waveguide and the second waveguide, and wherein the first portion of the first waveguide moves sufficiently far from the second waveguide on said portion of the substrate as the platform is twisted that the first portion of the first waveguide does not evanescently couple to the second waveguide.

33. A method according to claim 32 wherein said method comprises deflecting said portion of the substrate in a direction opposite to a direction in which the platform is twisted.

34. A method according to claim 32 wherein said platform is twisted about the deflection point.

35. A method of making an optical waveguide device, said method comprising forming a platform in a plane of a substrate and attached to the substrate at attachment points so that said platform is twistable out of the plane of the substrate, and forming a first waveguide on the substrate in sufficient proximity to the platform that twisting the platform effects a change in power of the optical signal travelling through the first waveguide.

36. A method according to claim 35 wherein said platform is formed by etching the substrate.

37. An optical waveguide device comprising (i) a substrate having a first platform attached to the substrate at an attachment point, which first platform is deflectable out of the plane of the substrate, (ii) a first waveguide, wherein deflection of said first platform effects a change in power of an optical signal travelling through the first waveguide, and (iii) a second waveguide traversing a second deflectable platform, wherein a portion of the first waveguide is separated from a portion of the second waveguide in a coupler region of the device by a first distance when the second deflectable platform and the first platform on which the first waveguide resides are deflected and a second distance when the second deflectable platform and the first platform on which the first waveguide resides are not deflected, and wherein power of an optical signal traversing the first waveguide couples to the second waveguide at a first separation, which first separation is equal to the first distance or the second distance or is between the first distance and the second distance, and wherein at a second separation not equal to the first separation less of the power of the optical signal traversing the first waveguide couples to the second waveguide.

38. An optical waveguide device according to claim 37 wherein the attachment point and the first platform are formed from a portion of the substrate.

39. An optical waveguide device according to any of claims 37–38 wherein a portion of the first waveguide resides on the first platform.

40. An optical waveguide device according to claim 39 wherein the first waveguide traverses the attachment point.

41. An optical waveguide device according to claim 37 wherein the portion of the first waveguide and the portion of the second waveguide in the coupler region remain coupled at the second distance to form an optical attenuator.

42. An optical waveguide device according to claim 37 wherein the portion of the first waveguide and the portion of the second waveguide in the coupler region are not coupled at the second distance.

43. An optical waveguide device comprising
(i) a substrate having a platform attached to the substrate at an attachment point, which platform can be deflected out of the plane of the substrate,
(ii) a first waveguide, wherein deflection of said platform effects a change in power of an optical signal travelling through the first waveguide, wherein a portion of the first waveguide resides on the platform, wherein the first waveguide traverses the platform and the first waveguide has a discontinuity at a boundary between the platform and the substrate so that a first portion of the first waveguide resides on the platform and a second portion of the first waveguide resides on the substrate such that an optical signal travelling through the first portion and second of the first waveguide is attenuated or shuttered when the platform is deflected out of the plane of the substrate, and (iii) a second waveguide positioned to receive the optical signal when the platform is deflected out of the plane of the substrate, wherein the second waveguide is positioned so that the optical signal reflects at the discontinuity from the first waveguide and into the second waveguide.

44. A method of altering the power of an optical signal traveling through a waveguide to effect attenuation, shuttering, or switching of an optical signal, said method comprising deflecting a platform having a first portion of a first waveguide mounted thereon a sufficient amount out of a plane of a substrate to move said portion of the waveguide and induce a change in power of the optical signal travelling through the waveguide, wherein said first portion of said first waveguide is optically aligned with a second portion of said first waveguide when said platform is in the plane of the substrate so that the optical signal traverses the first portion of the first waveguide and the second portion of the first waveguide, and wherein the first portion loses optical alignment with the second portion of the first waveguide as the platform is deflected out of the plane of the substrate, and wherein said platform is deflected a sufficient amount that the optical signal reflects from an end of the first portion of the waveguide and to a second waveguide so that the optical signal switches to the second waveguide when the platform is deflected said amount.

45. A method of altering the power of an optical signal traveling through a waveguide to effect attenuation, shuttering, or switching of an optical signal, said method comprising deflecting a platform having a first portion of a first waveguide mounted thereon a sufficient amount out of a plane of a substrate to move said portion of the waveguide and induce a change in power of the optical signal travelling through the waveguide, wherein said first portion of said first waveguide is sufficiently close to a second waveguide on a portion of the substrate when said platform is in the plane of the substrate that the optical signal evanescently couples in the first portion of the first waveguide and the second waveguide, and wherein the first portion of the first waveguide moves sufficiently far from the second waveguide on said portion of the substrate as the platform is deflected that the first portion of the first waveguide does not evanescently couple to the second waveguide, and wherein said method further comprises deflecting said portion of the substrate in a direction opposite to a direction in which the platform is deflected.

46. A method of altering the power of an optical signal traveling through a waveguide to effect attenuation, shuttering, or switching of an optical signal, said method comprising deflecting a platform having a first portion of a first waveguide mounted thereon a sufficient amount out of a plane of a substrate to move said portion of the waveguide and induce a change in power of the optical signal travelling through the waveguide, wherein said first portion of said first waveguide is sufficiently close to a second waveguide on a portion of the substrate when said platform is in the plane of the substrate that the optical signal evanescently couples in the first portion of the first waveguide and the second waveguide, and wherein the first portion of the first waveguide moves sufficiently far from the second waveguide on said portion of the substrate as the platform is deflected that the first portion of the first waveguide does not evanescently couple to the second waveguide, and wherein said platform is twisted about the deflection point.

* * * * *